July 14, 1959   A. K. SIMONS ET AL   2,894,563
SEAT STRUCTURE FOR FARM TRACTORS AND THE LIKE
Filed Aug. 1, 1955   3 Sheets-Sheet 1
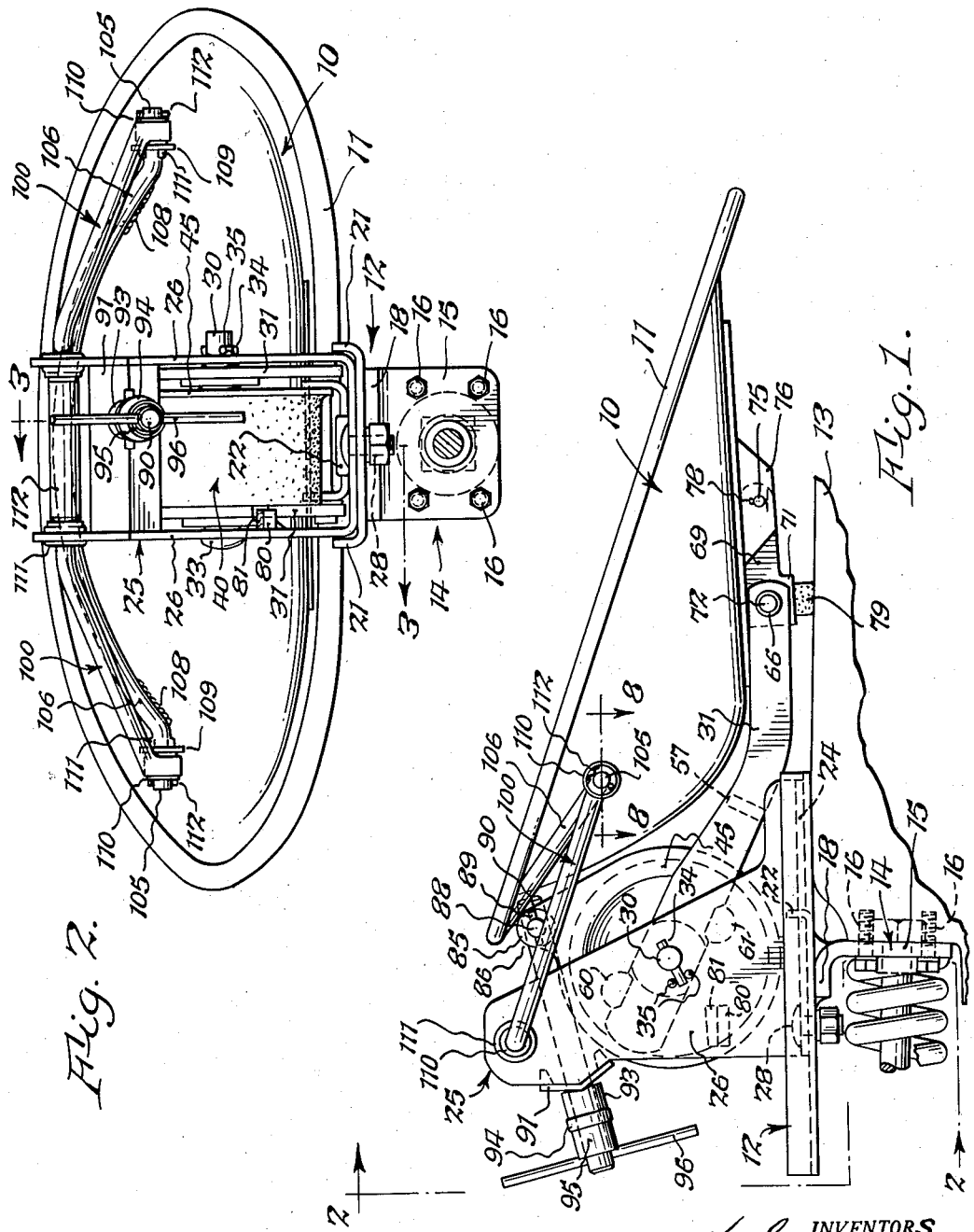
INVENTORS
Allison K. Simons
Arthur O. Radke
Albert F. Stickman
by Popp and Sommer
Attorneys.

July 14, 1959  A. K. SIMONS ET AL  2,894,563
SEAT STRUCTURE FOR FARM TRACTORS AND THE LIKE
Filed Aug. 1, 1955  3 Sheets-Sheet 2
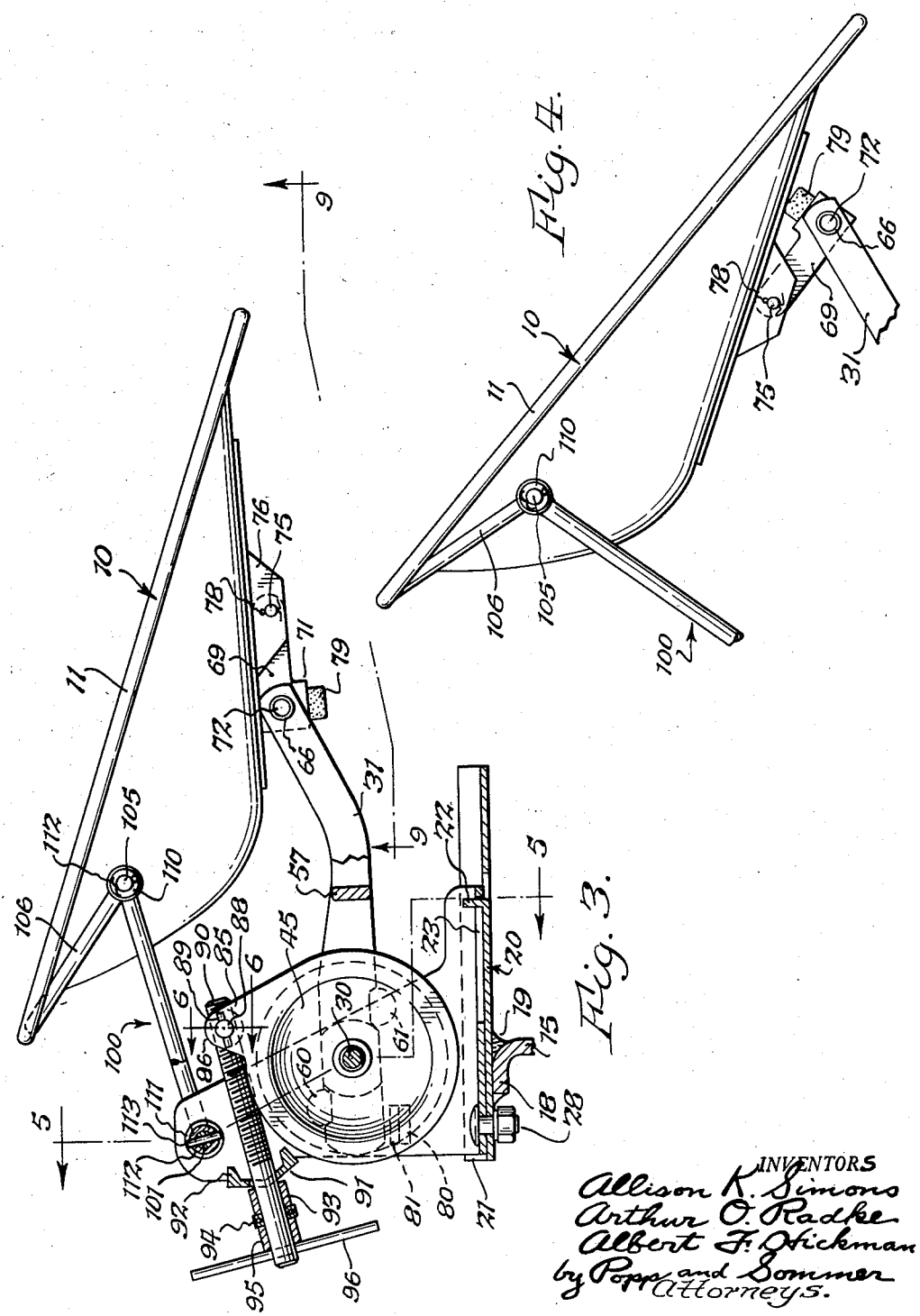
INVENTORS
Allison K. Simons
Arthur O. Radke
Albert F. Hickman
by Popps and Sommer
Attorneys.

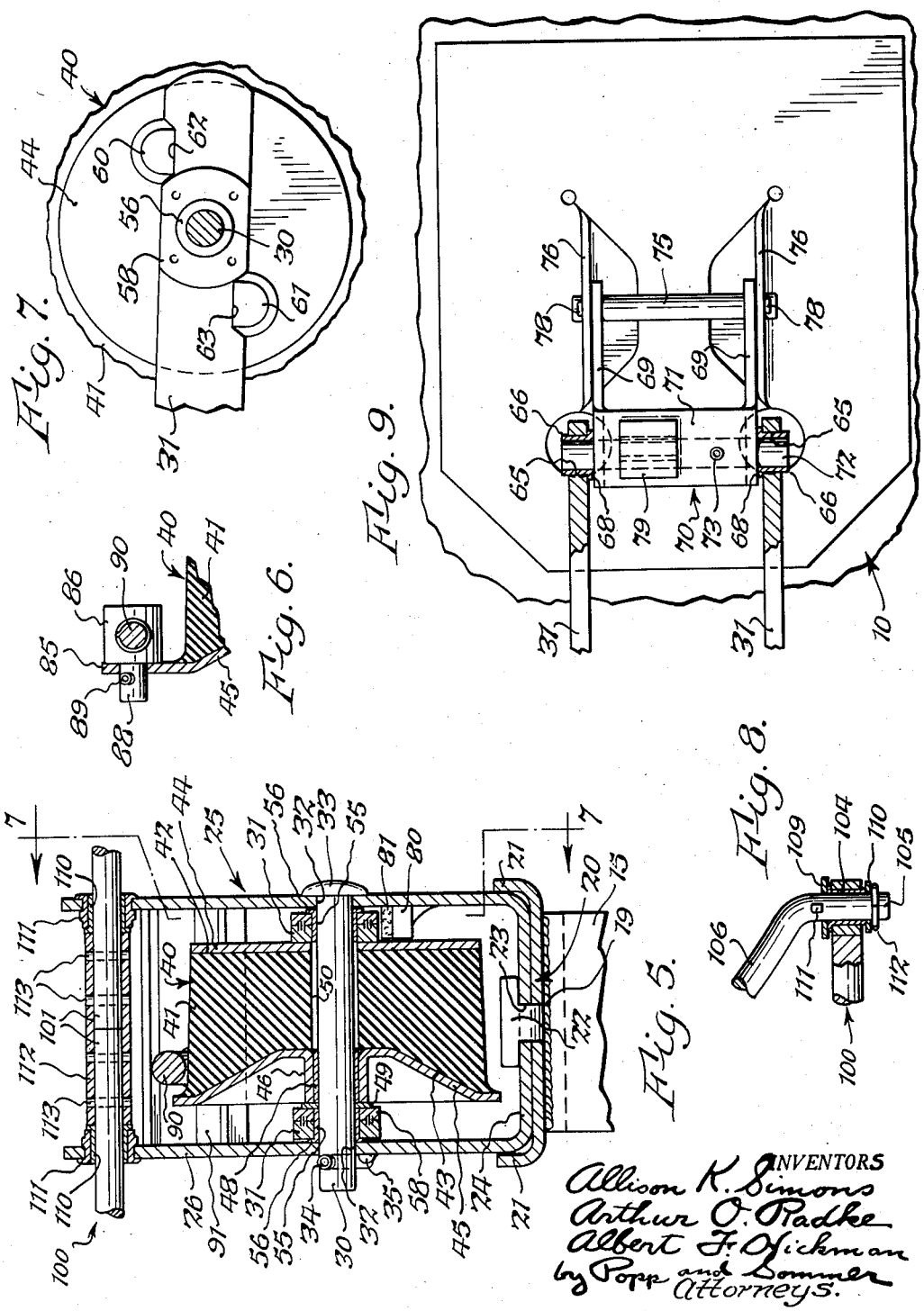

United States Patent Office
2,894,563
Patented July 14, 1959

2,894,563

SEAT STRUCTURE FOR FARM TRACTORS
AND THE LIKE

Allison K. Simons, Whitefish Bay, and Arthur O. Radke, Wauwatosa, Wis., and Albert F. Hickman, Eden, N.Y., assignors to Hickman Industries, Inc., Eden, N.Y., a corporation of New York Application August 1, 1955, Serial No. 525,639

3 Claims. (Cl. 155—51)

This invention relates to a seat structure and more particularly to such a seat structure designed primarily for use with extremely rough riding vehicles, such as farm tractors and military vehicles, features of the invention being capable of use in railroad locomotives and highway trucks.

One of the principal objects of the present invention is to provide such a seat structure which can be contained within a very limited space and which, at the same time, provides the required safety and comfort and leaves the occupant in full control of all of the controls of the vehicle, and in which the seat moves with the occupant and is not drawn or jerked away from the occupant whenever the pressure imposed by the occupant upon the seat becomes negative.

Another important object of the invention is to provide in such a compact seat structure a very low spring frequency when in use.

Another object of the invention is to provide such a seat which, while compact, can be adjusted to load variations so as to adapt the seat to persons of extremely different weight.

Another object of the invention is to provide such a seat structure in which only one rubber torsion spring is required to provide a desirable long range of movement and in which this torsion spring is simple, compact, low in cost and is free from service difficulties.

Another object of the invention is to provide such a spring suspension in which the seat part is supported and stabilized by a simple link and lever combination and in which the lever essentially functions to support the seat in a vertical direction and in which the link essentially functions to support the seat part against longitudinal and lateral displacement and hence stabilizes the same.

Another object of the invention is to provide such a seat structure which includes a conventional form of seat part and in which the pivot points for the lever and link combination, which combination supports and stabilizes the seat, are widely spaced, both vertically, laterally and longitudinally so as to avoid concentration of the stresses at any point of the seat part, lever or link and the pivotal connections of these parts.

Another object of the invention is to provide such a supporting lever and link combination which is of long effective length, while at the same time providing a seat structure which is extremely compact.

Another object of the invention is to provide such a seat structure which is made of a plurality of low cost and sturdy subassemblies which can be easily coupled together.

Another object of the invention is to provide an extremely simple and easily manipulated adjustment for adapting the seat to drivers of different weight.

Another object of the invention is to provide a simple, sturdy and low cost connection between the main lever arms for the seat part and the rubber torsion spring supports for these lever arms.

Another object is to provide such a seat structure in which the seat part of the seat structure can be moved directly back and to a tilted position in which it will drain any rain falling thereon and also allow the driver to stand up without having the seat part interfere with his legs.

Another important object of the invention is to provide a simple and inexpensive connection between a main lever and a rubber spring which avoids the imposition of any eccentric forces upon the rubber spring.

Other objects and advantages of the invention will be apparent from the following description and drawings in which:

Fig. 1 is a side elevational view of a seat structure embodying the present invention and showing the same mounted upon a part of a farm tractor.

Fig. 2 is a rear elevational view of the seat structure shown in Fig. 1, generally along the line 2—2 of Fig. 1.

Fig. 3 is a vertical section taken generally on line 3—3, Fig. 2 with parts shown in elevation.

Fig. 4 is a fragmentary view similar to Fig. 3 and showing the position of the parts when the bucket seat has been moved backwardly and to a tilted position for the purpose of either avoiding interference with the legs of the driver of a tractor while standing on the tractor or to drain the seat in the event of rain.

Fig. 5 is a vertical, transverse section, on an enlarged scale, taken generally on line 5—5, Fig. 3.

Fig. 6 is an enlarged fragmentary, vertical section taken on line 6—6, Fig. 3.

Fig. 7 is a fragmentary, vertical section taken generally on line 7—7, Fig. 5.

Fig. 8 is an enlarged fragmentary, vertical section taken on line 8—8, Fig. 1.

Fig. 9 is a fragmentary, horizontal bottom plan view, partly in section, and taken on line 9—9, Fig. 3.

The vehicle seat structure embodying the present invention is designed primarily for use with rough riding vehicles, such as farm tractors or military vehicles where vertical, lateral and fore-and-aft stability is required and where, at the same time, the space requirements are such that the space available for the seat structure and to accommodate the movement of the seat structure is very limited.

The seat structure is shown as having a seat part 10 in the form of a sheet metal bucket type seat or saddle having a beaded edge 11 and is shown as carried through a suspension embodying the present invention on a base part 12 mounted on the chassis 13 of the tractor or other vehicle which the seat structure serves.

The base part of the seat structure is shown as including an L-shaped bracket 14 having a vertical part 15 shown as secured by screws 16 to the tractor 13. This bracket 14 is also shown as having a horizontal part 18 which can be secured, as by weldments 19, to the under side of a horizontal plate 20. For strength, this horizontal plate is shown as having upstanding side flanges 21, best shown in Figs. 1 and 5 and at its center, this plate has a lip 22 struck upwardly therefrom, this lip extending transversely of the plate 20 and being T-shaped in elevation as best shown in Fig. 5. The narrow part of this T-shaped flange 22 fits in a slot 23 in the horizontal cross part 24 of a U-shaped bracket 25, the arms or side walls 26 of which project upwardly from adjacent the inner faces of the side flanges 21 of the base plate 20, these side flanges 21 thereby holding the U-shaped supporting bracket 25 against twisting about a vertical axis. The U-shaped bracket 25 is shown as secured to the base plate 20 by a bolt 28 which extends vertically through the rear ends of these parts and secures them together.

A main cross pin 30, and which serves as a fulcrum for the main lever arms 31 of the suspension, extends through opennigs 32 in the arms or side wall 26 of the supporting bracket 25, this pin being normally non-rotatable with respect to the bracket arms 26. This pin is shown as provided at one end with a head 33 and at its opposite end being a retaining drive pin 34, one end of this drive pin being shown as arranged between a pair of beads 35 struck outwardly from the corresponding bracket arm or side wall 26 so as to prevent rotation of the main journal pin 30.

On the cross pin 30 is adjustably mounted the rubber torsion spring 40 which provides the resilient resistance for the seat structure. This rubber spring is shown as comprising a generally cylindrical body 41 of rubber having at one end a flat face 42 and having at its other end a concave face 43. To the flat face 42 of the rubber body is vulcanized a metal disk 44 and to the opposite convex face 43 is vulcanized a conforming convex metal anchoring disk or plate 45, this anchoring plate having a cylindrical hub 46 in which a bearing bushing 48 is press fitted. A washer 49 serves as thrust bearing. Desirably, to avoid unnecessary heat and friction clearance 50 is provided between the pin 30 and the rubber body 41 as well as between this pin and the metal disk 44.

The two lever arms 31 are journalled on the pin 30 on opposite sides of the rubber spring 40 and for this purpose, each of these arms 31 is provided at its inner end with a bore in which a bearing bushing 55 is press fitted, each of these bearing bushings preferably being provided with a thrust flange 56 which is interposed between its arm 31 and the corresponding arm 26 of the U-shaped supporting bracket 25. The two lever arms 31 are preferably cross connected by a cross bar 57 and a hub piece 58 is also preferably welded to each arm 31, and the hub piece 58 of the corresponding lever arm 31 also preferably bears against the thrust washer 49.

The disk 44 of the rubber spring 40 is compelled to rotate with the adjacent lever arm 31 and for this purpose, as best shown in Fig. 7, a pair of abutment members 60 and 61 are secured, as by welding, to the outer face of the disk 44 on diametrically opposite sides of this disk and in position to engage opposite sides of the corresponding lever arm 31. To provide a fit for these abutments, the opposite edges of the lever arm are preferably indented, as indicated at 62 and 63 in Fig. 7. It will be seen that these abutments 60, 61 insure that the corresponding lever arm 31 rotates with the disk 44 and it will also be seen that this arm 31 is held in operative engagement with these abutments by the thrust flange 56 of the corresponding bearing bushing 55 which prevents lateral displacement of this lever arm 31 with reference to both the U-shaped bracket 25 and also the disk 44. The employment of the opposite abutment members 60 as well as the notches 62, 63 also has a very important result in balancing the stress imposed upon the rubber body 41 of the rubber spring 40. Thus, it will be noted that by these two abutments 60, 61 confined in the notches 62, 63, respectively, the force of this lever arm 31 is applied to both sides of the disk 44 and hence this force is applied to both sides of the rubber body 41 thereby to avoid any eccentric stress upon the rubber body 41.

The free or forward end of each lever arm 31 is provided with a bore 65, these bores 65 alining with each other and each having press fitted therein a bearing bushing 66. Each of these bearing bushings is shown as having a thrust flange 68, which flanges are arranged in opposed relation to each other and bear against the arms 69 of a U-shaped yoke or link 70 having a flat cross part 71. The arms 69 at the ends connected by the cross part 71 are fixed to a pin 72, as by a cross pin 73 and the projecting ends of this cross pin 72 are journalled in the bearing bushings 66. The arms 69 of the U-shaped yoke or link 70 are connected to another cross pin 75, the opposite ends of which extend through ears 76 struck downwardly from the bottom of the bucket seat 10. The arms 69 are preferably flat and have face contact with the flat vertical inner faces of the ears 76 and the cross pin 75 can be secured against endwise displacement by the provision of cotter pins 78.

Desirably, a rubber bumper 79 is suitably secured to the under part of the cross part 71 of the U-shaped yoke or link 70, this bumper being in position to engage the tractor chassis 13 as best shown in Fig. 1 and also being engageable with the underside of the bucket seat 10 as shown in Fig. 4. This rubber bumper 79, in the normal use of the seat, limits the downward movement of the seat by engaging the chassis 13. In order to limit the upward movement of the seat, a stop 80 is shown as welded to the inner face of one of the arms 26 of the U-shaped bracket 25 in position to engage the corresponding lever arm 31.

This stop can be provided on the side which engages the arm 31 with a woven fabric facing or bumper 81 and it will be seen that when the bucket seat 10 reaches its upward position shown in Fig. 3, under the influence of the rubber spring 40, the stop 80, 81 becomes effective.

This stop is also effective in determining the amount of pretensioning or windup which is imposed upon the rubber spring 40, this amount of pretensioning being adjustable to corresponding drivers of different weights. The adjustment of this pretensioning is preferably effected as follows:

The numeral 85 represents an ear or tab which projects upwardly from the edge of the movable disk 45 of the rubber spring 40 and which pivotally carries a nut 86. As best shown in Fig. 6, this nut is provided with a stem 88 extending through the tab or ear 85 which can be held in place by a small drive pin 89. The stem 88 is capable of rotating relative to the tab 85 and a handscrew 90 is screwed into the nut 86, this handscrew extending through a cross plate 91 which bears against the rear edges of the two arms or side walls 26 of the U-shaped bracket 25. This cross plate 91 is preferably V-shaped in cross section as best shown in Figs. 1 and 3 and is welded to the arms or side walls 26. The purpose of making the cross plate 91 V-shaped in cross section is to provide a sharp ridge against which a thrust sleeve 93 bears, this thrust sleeve being loosely fitted on the unthreaded end of the handscrew 90. This unthreaded end of the handscrew also carries a roller thrust bearing 94 which is interposed between the thrust sleeve 93 and another thrust sleeve 95 which can also be loosely fitted on the unthreaded end of the handscrew 90. The handscrew has a handle 96 in the form of a cross pin, this handle 96 holding the thrust sleeves 93, 95 and thust bearing 94 in compressive relation to one another, the pressure being supplied by the pretensioned condition of the rubber spring 40.

The upper part of the bucket seat 10 is guided in its movement by a pair of links indicated generally at 100, these links also serving as the principal means whereby the seat is stabilized horizontally in its vertical movement. This pair of links is preferably made of two sections each having an inner straight end or pivot pin 101 and an outer end which curves forwardly so that the forward extremities of the link are disposed on opposite sides of the bucket seat 10 in relatively close proximity to the upper beaded edge 11 of the bucket seat. The outer extremity of each link 100 is provided with a bore in which a bearing bushing 104 is fitted, as best shown in Fig. 8, the axis of this bearing bushing 104 being parallel with the straight parts or pivot pins 101, 101 of the links. As best shown in Fig. 8, the bearing bushing 104 at each side of the bucket seat journals the straight part or pivot pin 105 at the end of a curving pieces of wire 106, this piece of wire providing these pivot pins 105 engaging the rear of the bucket seat 10 immediately under the bead 11 thereof and being welded to the bucket seat as indicated at 108, Fig. 2. Any suitable means can be provided for preventing displacement of the pivot pins 105 from the bearing bushings 104, the means shown in Fig. 8 comprising a pair of washers 109 and 110 around each pivot pin 105 and on opposite sides of the corresponding bearing bushing 104 and an upset portion 111 on each pivot pin 105 bearing against the washers 109 with a cotter pin 112 bearing against the washers 110.

As best shown in Fig. 5, the coaxial pivot pins 101, 101 formed at the rear ends of the links 100 are journalled in bearing bushings 110 which in turn are press fitted in thimbles or cylindrical grommets 111 secured in the side walls 26 of the U-shaped bracket 25. A sleeve 112 surrounds the opposing ends of the pivot pins 101 and is in abutting relation to the bearing bushings 110. Pins 113 connected each pivot pin 101 to the sleeve 112 and hence these pivot pins 101 are connected to each other and the sleeve 112 forms a cylindrical enlargement of these pivot pins which prevents their axial displacement.

In use, the operator first pretensions the rubber spring 40 to correspond to his weight. He does this by reaching back of the seat and turning the handle 96 of the handscrew 90 to either increase or decrease the pretensioning of this spring. If the driver is heavy and he requires a greater degree of pretensioning, he would turn the handle 96 so as to draw the nut 86 rearwardly and thereby turn the anchoring plate 45 of the rubber spring 40 counterclockwise as viewed in Fig. 3, this plate turning about its bearing bushing 48. This movement of this anchoring plate 45 is effected by the handscrew 90 being held against movement through the thrust collars 93 and 95 and the interposing thrust bearing 94 and which bear against the stationary cross bar 91.

After the seat has been adjusted, it is ready for use and on encountering a bump in the field, the chassis 13 of the tractor is driven upwardly thereby to raise the base part 12 of the seat structure. Because of the weight of the driver seated upon the bucket seat 10, this force is not, however, transmitted directly to the driver and the bucket seat goes down, the two main lever arms 31 swinging downwardly and clockwise about the cross pin 30 as an axis. Through the lugs 60 and 61, this movement is transmitted to the movable plate 44 of the rubber spring and this movable plate is rotated in a clockwise direction as viewed in Figs. 1 and 3.

It will particularly be noted that by the use of the two abutments 60 and 61 in the sockets 62 and 63, the force of the corresponding lever arm 31 is applied equally to opposite sides of the movable plate 44 so that balanced forces are impressed upon this plate and the rubber body 41 to which it is vulcanized. Since the opposite end of this rubber body is vulcanized to the stationary, but adjustable, anchoring plate 45, it will be seen that this downward movement of the main lever arms 31 is yieldingly resisted by the rubber spring 40 so as to cushion the impact resulting from the tractor encountering a bump in the field. If the bump is severe enough, the seat structure will bottom by the rubber bumper 79 engaging the chassis 13 of the tractor. In any rebound action, the upward movement of the bucket seat 10 is limited by the fabric faced stop 80 which engages the corresponding lever arm 31, this stop also determining the amount of pretensioning which can be applied.

As the bucket seat 10 descends, its upper part is guided so that it cannot have any material pitch or any material amount of lateral instability. This is effected by the two links 100 which are journalled in the upper ends of the arms or side walls 26 of the U-shaped bracket 25 and which connect with the pivot pins 105 at the outer extremities of the wire bar 106 welded to the rear upper part of the bucket seat 10. It will particularly be noted from Fig. 2 that these pivot pins 105 are widely spaced so as to prevent lateral tipping of the seat while moving upward and downward and also when traveling along a side hill. It will also particularly be noted from Fig. 1 that these pivot pins 105 are located a substantial distance forwardly of the rear extremity of the bucket seat 10 and also a substantial distance from the pivot pin 72 at the outer extremity of the arms 31 of the main supporting lever. By this arrangement of these pins, the bucket seat 10 is supported in the manner of a basket at widely spaced points both horizontally and vertically thereby to avoid undue stresses on any of the parts, particularly on the bucket seat 10 itself as well as the various bearings.

If the driver wishes to stand up on the tractor and desires to avoid having the bucket seat in the way of the calves of his legs, he seizes the rear end of the bead 11 of the bucket seat 10 and lifts it up. This raises the sections of the link 100 to the approximate 45° angular position shown in Fig. 4 and also swings the link 69 counterclockwise about the axis of the cross pin 72 from the position shown in Fig. 3 to the position shown in Fig. 4 in which the bumper 79 now engages the bottom plate of the bucket seat 10. Since the weight of the bucket seat 10 is now bearing downwardly on the bumper 79, the parts will remain in this position shown in Fig. 4 in which position the bucket seat 10 is displaced rearwardly to a substantial extent as compared with the normal ride position illustrated in Fig. 3. Also in this position, the bucket seat 10 will drain so that it is desirable to lift the bucket seat to this position when the tractor is shut down for the night.

To restore the bucket seat from the position shown in Fig. 4 to the position shown in Fig. 3, all that is necessary is to lift the forward end of the bucket seat 10 and swing it forwardly and downwardly, the parts thereby being restored to normal operating position.

It will be seen that the compactness of the present invention is in large measure achieved by the proportions of the parts and pivot positions. Thus, it will be noted that the lever arms 31 are relatively long as compared with the links 100; that the axis of the fulcrum pivot pin 30 is arranged forwardly of the axis of the pivot pins 101 of the links 100 and that the axis of the pivots 72 at the outer ends of the main lever arms 31 are disposed forwardly of the pivots 105 at the forward ends of the links 100. It will also be noted that the main lever arms 31 and links 100 operate generally in the manner of a parallelogram and that while the bearings 66 for the main lever arms 31 are spaced approximately equal to the spacing of the fulcrum bearings 55 thereof as well as to the spacing of the bearings 110 for the links 100, the bearings 104 at the forward end of the links 100 are spaced much further apart in order to obtain lateral stability. It will also be noted that while the lever arms 31 are arranged inside of the side walls 26 of the U-shaped bracket 25, the links 100 are arranged externally of this bracket.

From the foregoing, it will particularly be seen that the seat forming the subject of the present invention is of simple and inexpensive construction and is compact thereby permitting it to be used where space is extremely limited. It will also be noted that by the construction shown, the seat is adequately supported upon a single rubber spring which is conveniently adjustable and at the same time, the seat is also prevented from lurching fore-and-aft or sideways but is fully stabilized by the upper links. It will also be seen that the seat can readily be moved to an inoperative position in which it is displaced rearwardly so as to leave the legs of the driver free from interference by the seat when standing on the tractor and that in this position, the seat drains.

We claim:

1. A seat structure, comprising a seat part, a base part arranged in rear of said seat part and having spaced side walls, a pair of relatively long lever arms arranged in horizontally spaced side-by-side relation adjacent said side walls to extend fore-and-aft with reference to said seat part, fulcrum bearing means journalling the rear ends of said lever arms on said base part to swing about a generally horizontal axis extending transversely of said seat part, bearing means pivotally connecting the front ends of said lever arms to said seat part and having an axis arranged generally parallel with said first generally horizontal axis, coaxial bearings severally extending through said side walls to about an axis generally parallel with said first generally horizontal axis, pins severally journalled in said bearings, a tube embracing and secured to the opposing ends of said pins, the opposite ends of said tube abutting against said bearings, relatively short links severally fast to the outer ends of said pins and arranged in horizontally spaced side-by-side relation generally parallel with and above said lever arms, bearing means spaced considerably further apart than said bearing means at the front ends of said lever arms and pivotally connecting the front ends of said links to said seat part and having an axis arranged generally parallel with said first generally horizontal axis, and means yieldingly resisting movement of said seat part with reference to said base part.

2. A seat structure, comprising a seat part, a base part arranged in rear of said seat part, a cross pin journalled in said base part to swing about a generally horizontal axis extending transversely of said seat part, a pair of relatively long lever arms severally fast to the opposite ends of said cross pin and extending in horizontally spaced side-by-side relation to extend fore-and-aft with reference to said seat part, bearing means pivotally connecting the front ends of said lever arms to said seat part and having an axis arranged generally parallel with said first generally horizontal axis, a pair of relatively short links arranged in horizontally spaced side-by-side relation generally parallel with and above said lever arms, bearing means journalling the rear ends of said links on said base part to swing about an axis generally parallel with said first generally horizontal axis, bearing means pivotally connecting the front ends of said links to said seat part and having an axis arranged generally parallel with said first generally horizontal axis, and means yieldingly resisting movement of said seat part with reference to said base part, comprising a rubber body surrounding said cross pin, a disk vulcanized to one side of said rubber body and having an opening through which said cross pin extends, lugs on diametrically opposite sides of said disk and projecting axially to embrace one of said lever arms and thereby compel said disk and said one of said lever arms to oscillate in unison, and means securing the opposite side of said rubber body to said base part.

3. A seat structure as set forth in claim 2 wherein said lugs project into notches provided on opposite sides of said one of said lever arms.

References Cited in the file of this patent

UNITED STATES PATENTS

| | | |
|---|---|---|
| 694,990 | Reed | Mar. 11, 1902 |
| 1,181,026 | Maslen | Apr. 25, 1916 |
| 2,486,048 | McIntyre et al. | Oct. 25, 1949 |
| 2,598,384 | Huber | May 27, 1952 |
| 2,652,880 | Gundersen | Sept. 22, 1953 |
| 2,783,822 | Hickman | Mar. 5, 1954 |